(12) United States Patent
Moore

(10) Patent No.: US 6,306,056 B1
(45) Date of Patent: Oct. 23, 2001

(54) DUAL ENGINE HYBRID ELECTRIC VEHICLE

(75) Inventor: Thomas S Moore, Oxford, MI (US)

(73) Assignee: DaimlerChrysler Corporation, Auburn Hills, MI (US)

(*) Notice: Subject to any disclaimer, the term of this patent is extended or adjusted under 35 U.S.C. 154(b) by 0 days.

(21) Appl. No.: 09/466,148

(22) Filed: Dec. 17, 1999

(51) Int. Cl.[7] ............................ F16H 3/72; F16H 37/06
(52) U.S. Cl. ................ 475/5; 475/2; 477/2; 180/65.1
(58) Field of Search .................... 475/2, 5, 4, 150; 477/3, 5, 7, 8, 2; 180/65.1–65.6

(56) References Cited

U.S. PATENT DOCUMENTS

| 4,392,393 | 7/1983 | Montgomery | 74/661 |
|---|---|---|---|
| 4,533,011 | 8/1985 | Heidemeyer et al. | 180/65.2 |
| 4,829,850 | 5/1989 | Soloy | 74/665 B |
| 5,398,508 | 3/1995 | Brown | 60/718 |
| 5,492,189 * | 2/1996 | Kriegler et al. | 180/65.2 |
| 5,495,912 | 3/1996 | Gray, Jr. et al. | 180/165 |
| 5,845,731 | 12/1998 | Buglione et al. | 180/65.2 |
| 5,908,077 | 6/1999 | Moore | 180/65.2 |

FOREIGN PATENT DOCUMENTS

| 08019113 * | 1/1996 | (JP) . |
|---|---|---|
| 411311137 * | 11/1999 | (JP) . |

* cited by examiner

Primary Examiner—Sherry Estremsky
Assistant Examiner—Tisha D. Lewis
(74) Attorney, Agent, or Firm—Mark P Calcaterra

(57) ABSTRACT

A hybrid electric powertrain system is provided including a first engine system, a second engine system and an electric motor. During normal driving conditions, a single engine is utilized for providing driving torque to the drive wheels. During periods of operation where increased levels of torque are required, the electric motor is operated temporarily while the second engine is started and brought up to speed to assist the first engine in providing driving torque to the driving wheels of the vehicle.

11 Claims, 4 Drawing Sheets

DUAL ENGINE HYBRID ELECTRIC VEHICLE

BACKGROUND OF THE INVENTION

FIELD OF THE INVENTION

The present invention relates generally to hybrid automotive vehicles, and more particularly to a dual engine hybrid electric vehicle.

BACKGROUND AND SUMMARY OF THE INVENTION

Hybrid vehicles employing internal combustion engines and electric motors to drive the vehicle are well known in the art. Previous hybrid electric vehicle designs have utilized an internal combustion engine which is strategically operated in combination with an electric motor in order to provide driving torque to the wheels of the vehicle.

Some of the existing hybrid electric vehicle designs have suffered from the deficiency that the internal combustion engine and motor often have to be designed with a larger capacity than is most often required for optimal efficiency.

The dual engine hybrid electric vehicle of the present invention overcomes these deficiencies by providing a hybrid electric power train system which includes dual engines, or alternatively, a dual crankshaft system independently operable for providing driving torque to a transmission. An electric motor/generator is also utilized for providing driving torque to the wheels of the vehicle. For purposes of this application, the term "electric motor/generator" is also intended to include a motor/alternator. Operation of the first and second engines such that during normal driving at constant speeds and typical driving load, a single engine is utilized for providing driving torque to the wheels of the vehicle. During periods of operation where increased levels of torque are required, such as during acceleration, pulling a heavy load, or climbing a hill, the electric motor is operated temporarily while the second engine is started and brought up to speed to assist the first engine in providing driving torque to the driving wheels of the vehicle.

The hybrid electric powertrain system of the present invention includes a first heat engine, a second heat engine, a torque transmission device operatively engagable with the first and second heat engines and adapted to selectively transfer torque from the first and second heat engines to a pair of driving wheels of the vehicle. An electric motor/generator is provided for delivering driving torque to at least one pair of driving wheels of the motor vehicle. A first clutch element is provided for transmitting torque from the first engine to a transmission gear train and a second clutch is provided for delivering torque from the second engine to the transmission geartrain.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings wherein.

DETAILED DESCRIPTION OF THE PREFERRED EMBODIMENTS

Figure 1:
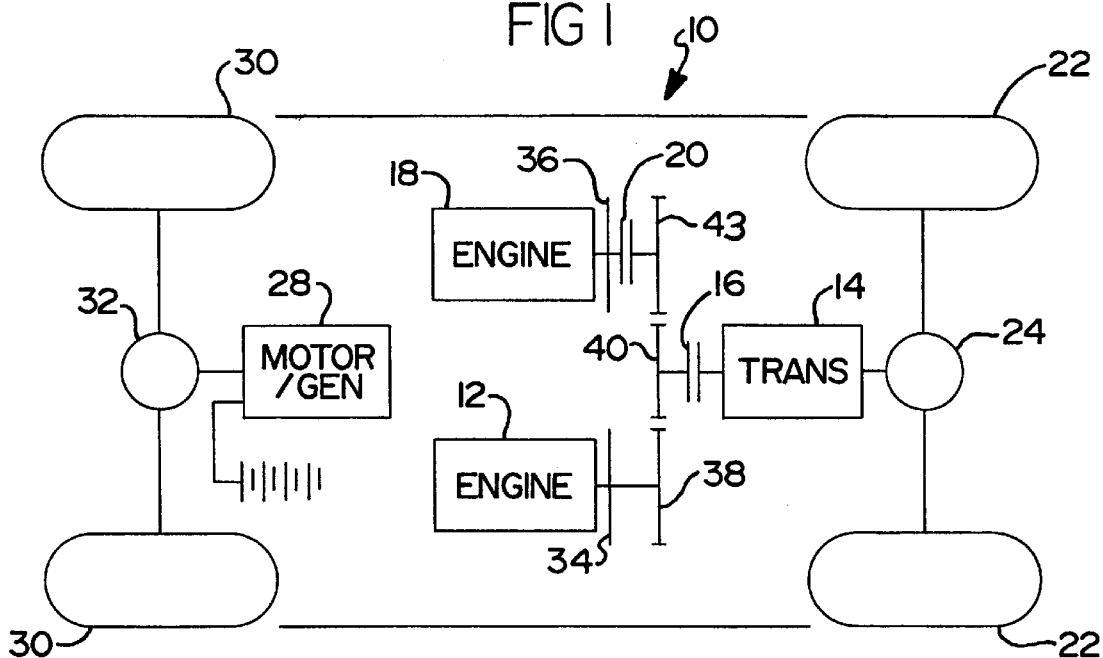
FIG. 1 is a schematic diagram of a dual engine hybrid electric vehicle according to the principles of the present invention.

With reference to FIG. 1, a motor vehicle 10 is shown including a dual engine hybrid electric powertrain system. The hybrid electric powertrain system includes a first engine 12 which delivers driving torque to a transmission 14 through a first clutch device 16. A second engine 18 is also adapted to provide driving torque to the transmission 14 via a clutch 20. The first engine 12 and second engine 18 provide driving torque to a pair of driving wheels 22 through the transmission 14 via a differential 24. An electric motor/generator 28 is adapted to provide driving torque to a second pair of driving wheels 30 via a differential 32. The first output shaft of the engine 12 and second engine 18 are each provided with a flywheel 34, 36, respectively. A gear 38 is attached to the output shaft of the first engine 12 and meshingly engages a driven gear 40. A second drive gear 42 is operatively engaged with the output shaft of the second engine 18 via the clutch 20. The second drive gear 42 also engages the driven gear 40. Torque is transmitted from the driven gear 40 via clutch 16 to the transmission 14.

Figure 2:
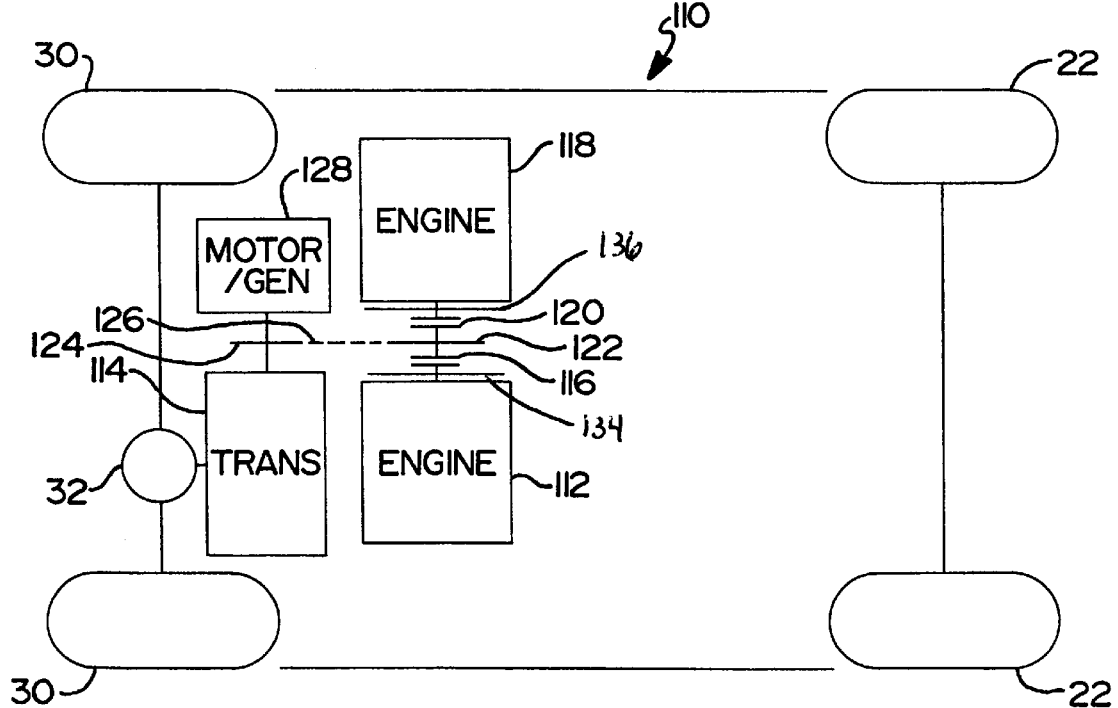
FIG. 2 is an alternative embodiment of the dual engine hybrid electric vehicle according to the principles of the present invention.

With reference to FIG. 2, a second embodiment of the present invention will now be described. The hybrid electric powertrain system 110 according to the second embodiment includes a first engine 112 and a second engine 118. Each engine 112, 118 is provided with a flywheel 134, 136. The first engine 112 transmits torque to a transmission device 114 via a first clutch device 116. The second engine 118 transmits driving torque to the transmission 114 via a second clutch 120. The first and second clutch devices 116, 120 when engaged, deliver torque to a drive sprocket 122 which transmits torque to a driven sprocket 124 via a chain 126. An electric motor/generator 128 is operatively engaged with the transmission 114 for providing driving torque thereto.

Figure 3:
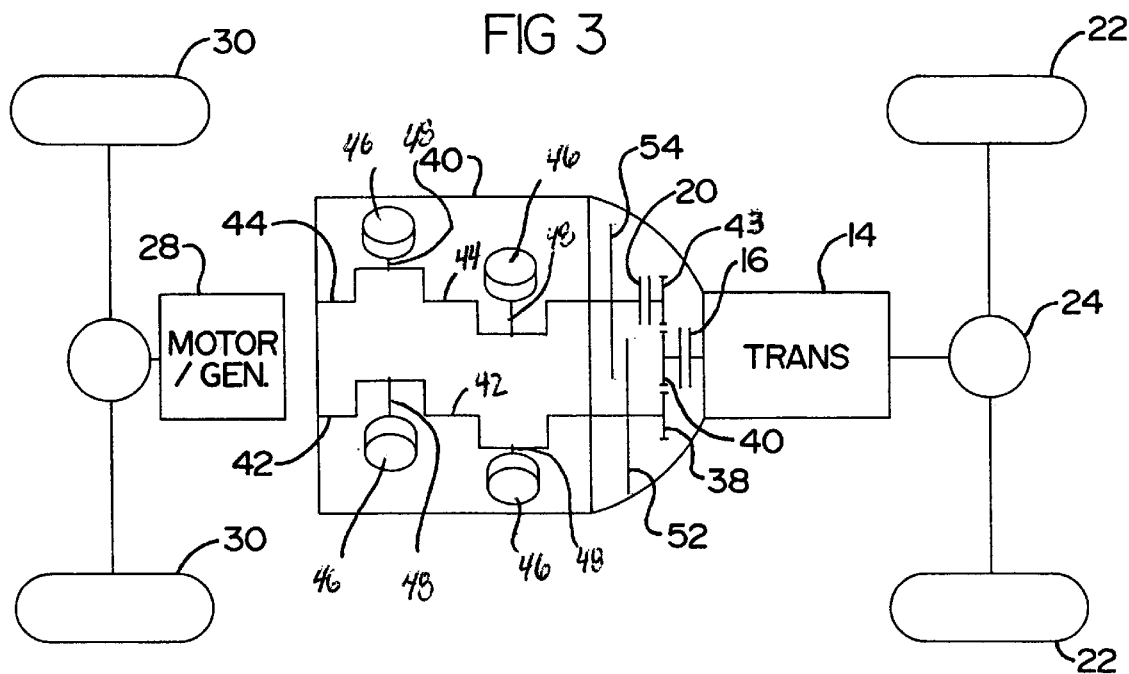
FIG. 3 is a schematic diagram of a third embodiment of the hybrid electric vehicle according to the present invention with single engine block and having dual crankshafts separately drivable for providing driving torque to the transmission of a hybrid electric vehicle according to the principles of the present invention.
Figure 4:
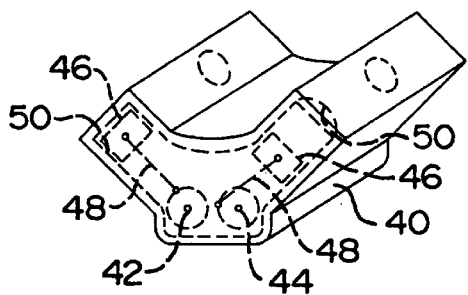
FIG. 4 is a schematic diagram of the layout of the dual crankshaft system of the engine shown in FIG. 3.
Figure 5:
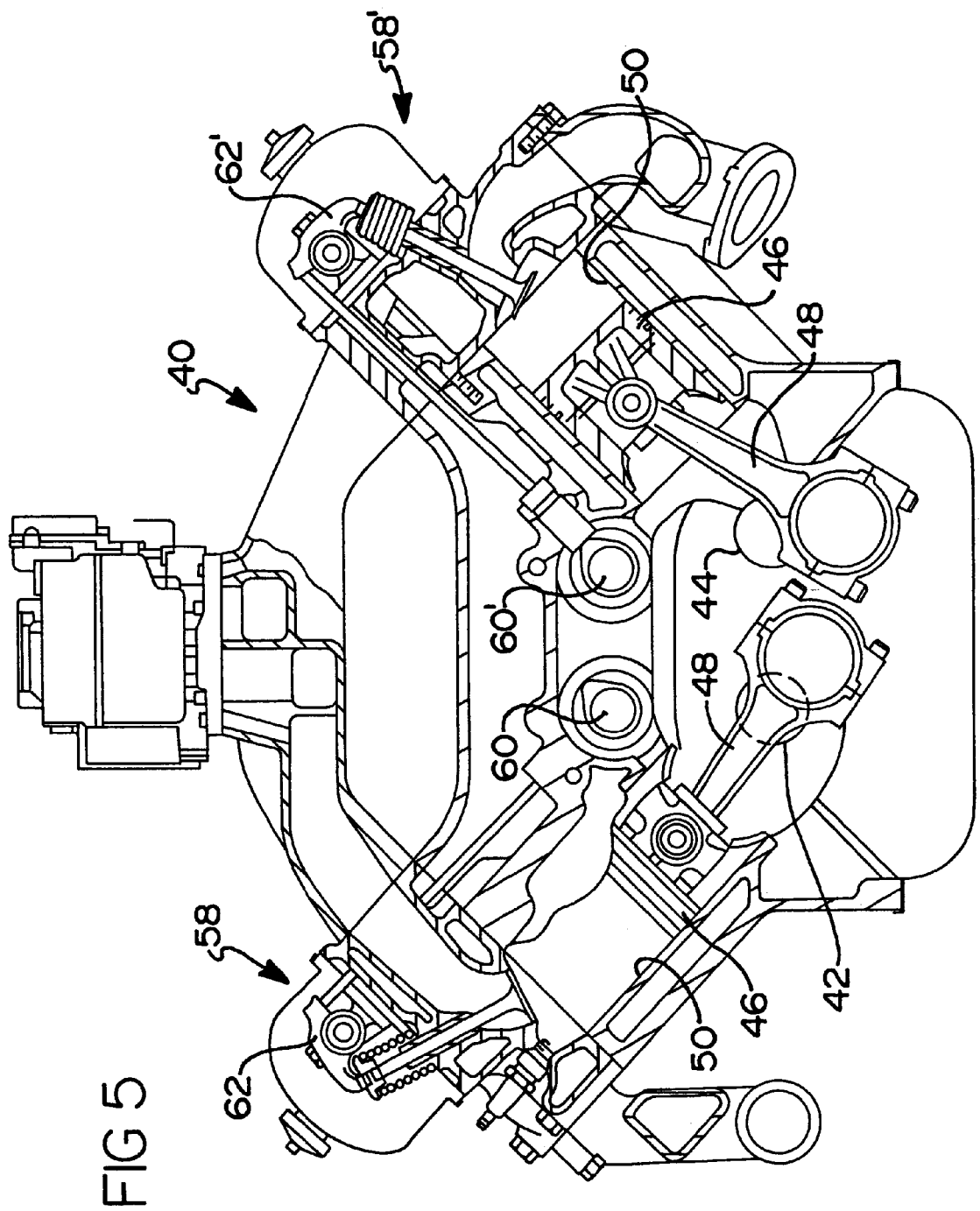
FIG. 5 is a detailed cross-sectional view illustrating the layout of the dual crankshaft internal combustion shown in FIGS. 3 and 4.

With reference to FIGS. 3–5, an alternative embodiment of the present invention is shown wherein the dual engine system is shown embodied in a single engine block 40 including dual crankshafts. In particular, the dual crankshaft engine 40 includes a first crankshaft 42 and a second crankshaft 44. A plurality of pistons 46 are connected to the crankshafts 42, 44 via connecting pins 48. The pistons 46 are disposed within cylinders 50 as is known in the art. In the embodiment shown in FIG. 3, each crankshaft 42, 44 is associated with two pistons disposed in two corresponding cylinders 50. However, it should be understood that any number of pistons 46 can be utilized according to the principles of the present invention.

It is intended that the dual crankshaft engine of the present invention can be operated individually while requiring only a minor increase in size in comparison with standard V-type or quad-type engines. As shown in FIG. 3, each crankshaft 42, 44 has a flywheel 52, 54, respectively. A first clutch 16 is provided for delivering torque from the first crankshaft 42 to the transmission 14. A second clutch 20 is provided for delivering driving torque from the second crankshaft 44 to the transmission device 14. The first crankshaft 42 is provided with a driving gear 38 which engages a driven gear 40. The driven gear 40 transmits torque to the transmission 14 via clutch 16. A second driving gear 43 is provided for delivering torque from the second crankshaft 44 to the driven gear 40 via the second clutch 20.

With reference to FIG. 5, a cross-sectional view of the dual crankshaft engine 40 of the present invention is provided. As shown, the left primary crankshaft 42 has associated with it a plurality of pistons 46 each connected to the crankshaft 42 via connecting rods 48. A valve train system 58 is provided including a camshaft 60 and rocker assemblies 62. Likewise, the right (secondary) crankshaft 44 is also provided with a plurality of pistons 46 connected to the crankshaft 44 via connecting rods 48. The pistons 46 and connecting rods 48 of each crankshaft 42, 44 are staggered in a longitudinal direction of the engine so that the crankshafts can be packaged more closely together without interfering with one another. A second valve train system 58' is provided including a second camshaft 60' and rocker assemblies 62'. The left and right crankshaft systems are separately operable but share several common elements. The common elements preferably include a single oil pump, water pump, cooling system, lubrication system, air filter, fuel system, engine block, exhaust system, and oil pan. The primary engine system powers the accessories and heats the catalyst.

Figure 6:
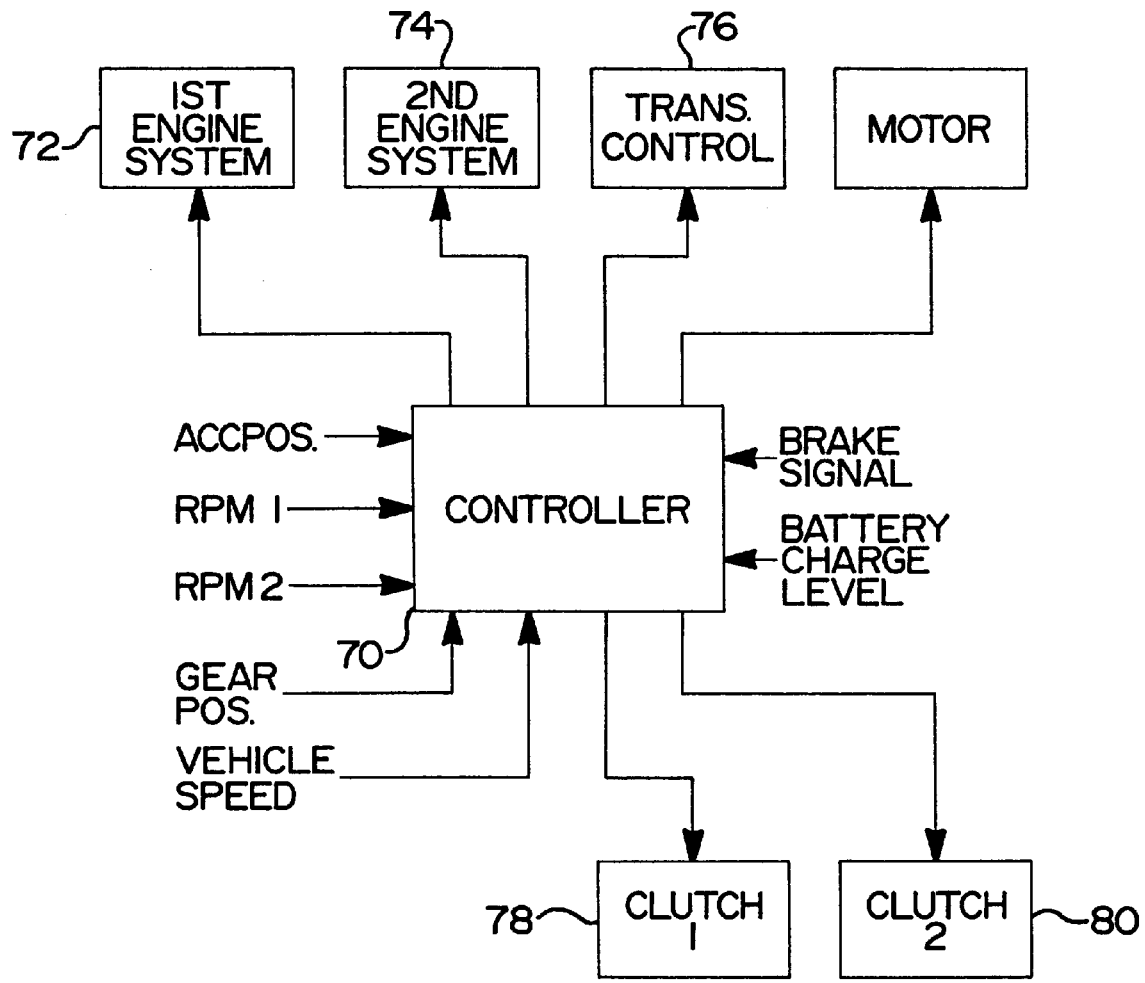
FIG. 6 is a diagram of a control system of the dual engine hybrid electric powertrain according to the principles of the present invention.

With reference to FIG. 6, the control system for controlling the dual engine hybrid electric powertrain system according to the principles of the present invention will now be described. The dual engine hybrid electric powertrain system controller 70 provides output signals to the first engine system 72 and second engine system 74. For purposes of this discussion, the first and second engine systems 72, 74 are meant to include separate engines as disclosed in the embodiments of FIGS. 1 and 2 but is also intended to include each crankshaft system 42, 44 of a dual crankshaft engine which is housed in a common engine block, but separately controlled according to the principles described herein.

The controller 70 also provides control signals to the transmission or transmission control unit 76, the motor/generator 28, and to first and second clutch actuators 78, 80. The controller 70 receives signals indicating the accelerator position, the brake pedal position, gear position, vehicle speed, battery charge level, the speed of the first engine system (rpm 1), and the speed of the second engine system (rpm 2). During normal operation, the first engine system 72 is running and the controller 70 provides signals to the first engine system 72 in order to meet the driving demands of the operator based upon the accelerator position and vehicle speed. The controller 70 also controls the transmission 14 according to well-known shift schedule parameters. Upon detection of a torque requirement greater than can be supplied by the first engine system 72, the controller 70 provides a signal to the motor/generator 28 to provide the added necessary torque to supplement the first engine system 72 in order to meet the operator's driving needs. The operation of the motor/generator can be temporary while the second engine system 74 is turned on and brought up to speed in order to meet the added driving torque requirements of the vehicle operator while the motor/generator 28 is then turned off. The electric motor is capable of being run at approximately 150 percent of its rated power for a short duration. For example, the controller 70 can operate the electric motor at 150 percent of its peak rated power for a period of up to approximately two seconds while the second engine system 74 comes on. Accordingly, if two engine systems of, for example, 115 hp each are provided in combination with a 70 hp rated electric motor, the system has a total of 300 hp capability. When a sudden increase in torque is required while operating only a single engine, the electric motor can be operated at 150 percent of its rated capacity to provide up to 220 hp (115 hp first engine+105 hp motor) for a short duration while the second engine system 74 is started up. The rated capacity of the electric motor is provided in part to prevent overheating of the electric motor. However, the electric motor can be operated safely at a higher capacity for a short time period.

The motor/generator can also be used in combination with both the first and second engine systems 72, 74 during wide open throttle or at other times when the torque requirement exceeds the amount that can be supplied by the first and second engine systems 72, 74 combined. In the above example, a total of 300 hp can be achieved.

In operation, the controller determines a torque demand $T_d$ based upon the accelerator position and vehicle speed. It will then be determined whether the torque demand $T_d$ is greater than the torque available from the first engine $T_{a1}$. If the torque demand does not exceed the amount of torque available from the first engine $T_{a1}$, then the first engine continues to be controlled according to normal operating parameters which are well known in the art. If the torque demand exceeds the torque available from the first engine ($T_d > T_{a1}$), it is then determined if the second engine system is ready to provide the additional torque necessary to meet the torque demand $T_d$. If the second engine system is not ready, the motor/generator is then operated to provide a motor torque $T_m$ equal to the difference between the torque demand $T_d$ and the torque available from the first engine $T_{a1}$. If the difference between torque demand $T_d$ and the torque available from the first engine $T_{a1}$ ($T_d - T_{a1}$) exceeds the torque available from the motor (28, 128) under normal operating conditions, the motor (28, 128) is operated at a level exceeding its normal power rating with the controller imposing a time limit for operation of the motor (28, 128) at this higher capacity in order to prevent overheating. The time limit can be a predetermined time period or can be obtained from a look-up table which includes the time limits based upon ambient temperature. Simultaneously, the second engine system 74 is started up and is brought up to speed to provide the added required torque $T_{a2}$ which is equal to the difference between the torque demand and the torque available from the first engine system ($T_d - T_{a1}$). At this time, the second clutch is engaged in order to provide driving torque from the second engine system 74 to the transmission 14. At this time, the torque generated by the motor/generator (28, 128) is decreased in order to provide a smooth transition from the motor (28, 128) to the second engine system 74 for providing the necessary torque to equal the amount of torque demand $T_d$.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motor vehicle having a hybrid electric powertrain system, comprising:
   a first heat engine;
   a second heat engine;
   a torque transmission device operatively engagable with said first and second heat engines and adapted to selectively transfer torque from said first and second heat engines to a pair of driving wheels of a vehicle; and
   an electric motor/generator for providing driving torque to at least one pair of driving wheels of the motor vehicle.

2. The motor vehicle according to claim 1, wherein said motor/generator is connected to said transmission for providing driving torque to said at least one pair of driving wheels of the motor vehicle.

3. The motor vehicle according to claim 1, wherein said electric motor is drivingly connected to said at least one pair of driving wheels through a differential.

4. The motor vehicle according to claim 1, wherein said torque transmission device includes a first clutch element for transmitting torque from said first engine to a transmission geartrain and a second clutch for delivering torque from said second engine to said transmission geartrain.

5. The motor vehicle according to claim 1, wherein said first heat engine and said second heat engine are each housed in a common engine block.

6. The motor vehicle according to claim 1, further comprising a controller for operating said first heat engine, said second heat engine and said motor/generator in response to a torque demand determined from vehicle operating conditions.

7. The motor vehicle according to claim 6, wherein when a torque demand exceeds an amount of torque available from said first heat engine, said controller operates said motor/generator to supply additional torque while said second heat engine is started up.

8. The motor vehicle according to claim 7, wherein if said torque demand exceeds an amount of torque available from said first heat engine and said motor/generator operating within a rated capacity limit, the controller operates said motor/generator at a capacity exceeding said rated capacity limit for a predetermined limited time period.

9. A motor vehicle having a hybrid electric powertrain system, comprising:
   a first heat engine;
   a second heat engine;
   a torque transmission device operatively engagable with said first and second heat engines and adapted to selectively transfer torque from said first and second heat engines to a pair of driving wheels of a vehicle;
   an electric motor/generator for providing driving torque to at least one pair of driving wheels of the motor vehicle; and
   a controller for operating said first heat engine, said second heat engine and said motor/generator in response to vehicle operating conditions.

10. The motor vehicle according to claim 9, wherein said controller operates said electric motor/generator when said first heat engine does not have sufficient torque to meet vehicle operating conditions.

11. The motor vehicle according to claim 10, wherein if said vehicle operating conditions require more torque than is available from said first heat engine and said electric motor/generator operating within a rated capacity limit, the controller operates said electric motor/generator at a capacity exceeding said rated capacity for a predetermined limited time period.

* * * * *